United States Patent [19]
McLean

[11] Patent Number: 5,186,271
[45] Date of Patent: Feb. 16, 1993

[54] SWIVEL HITCH WITH IMPROVED MOUNTING OF LOWER GEARBOX

[75] Inventor: Kenneth W. McLean, New Holland, Pa.

[73] Assignee: Ford New Holland, Inc., New Holland, Pa.

[21] Appl. No.: 708,652

[22] Filed: May 31, 1991

[51] Int. Cl.$^5$ .................. B60D 1/00; B60K 25/08
[52] U.S. Cl. .................. 180/14.4; 180/53.6; 74/15.6
[58] Field of Search ............... 180/53.6, 53.61, 53.62, 180/14.4, 53.3, 53.8, 53.1; 74/15.6, 15.69, 606 R; 172/47, 125; 56/14.7, 15.6, 15.7, DIG. 14; 267/293, 141.2, 153

[56] References Cited

U.S. PATENT DOCUMENTS

| | | | |
|---|---|---|---|
| 1,778,503 | 1/1927 | Lord | 267/141.2 |
| 3,557,892 | 1/1971 | Burrough | 180/14.1 |
| 3,897,841 | 8/1975 | Phillips et al. | 180/53.1 X |
| 4,525,987 | 7/1985 | Werner et al. | 56/15.2 |
| 4,738,461 | 4/1988 | Stephenson et al. | 280/400 |
| 4,793,430 | 12/1988 | Stephenson et al. | 180/14.4 |
| 4,805,927 | 2/1989 | Stephenson et al. | 180/14.4 X |

*Primary Examiner*—Charles A. Marmor
*Assistant Examiner*—Florian Zeender
*Attorney, Agent, or Firm*—Larry W. Miller; Frank A. Seemar

[57] ABSTRACT

A primary drive line for delivering power from a power-take-off (pto) shaft on a tractor to an input shaft on an implement includes a swivel hitch comprised of an upper gearbox and a lower gearbox. The upper gearbox is fastened to a pair of spaced apart, upper vertical plates carried on a tongue extending forwardly from the implement, and the lower gearbox is fastened to a pair of spaced apart, lower vertical plates carried by a yoke assembly that is attached to the tractor. An output shaft on the upper gearbox is coupled to the implement input shaft. The lower gearbox has two shafts, the first of which is coupled to an input shaft on the upper gearbox. The second shaft on the lower gearbox is connected to the tractor pto shaft. The lower gearbox is mounted by using bushings with rubber inserts which permit limited repositioning of the lower gearbox with respect to the yoke assembly in order to compensate for any misalignment of the lower gearbox first shaft when coupling it to the upper gearbox input shaft.

4 Claims, 2 Drawing Sheets

SWIVEL HITCH WITH IMPROVED MOUNTING OF LOWER GEARBOX

BACKGROUND OF THE INVENTION

This invention relates generally to agricultural machines and, in particular, to a swivel hitch for connecting an implement to a tractor.

U.S. Pat. No. 4,738,461 to Stephenson et al discloses a swivel hitch including an upper gearbox coupled to an input shaft on an implement and a lower gearbox connected to a power-take-off shaft on a tractor. In order to achieve the desired maneuverability of the implement during normal operation, the lower gearbox rotates relative to the upper gearbox about a vertical axis when the tractor makes turns. The upper gearbox is rigidly mounted on a tongue extending forwardly from the implement and has an input shaft coupled to an output shaft on the lower gearbox by a coupling device. The lower gearbox is rigidly bolted to a bracket carried by a hitch adaptor that is attached to the tractor. If there is any misalignment between the lower gearbox output shaft and the upper gearbox input shaft, it will be difficult to couple these shafts together.

SUMMARY OF THE INVENTION

The present invention is directed to an arrangement wherein a power-take-off shaft on a tractor delivers power through a primary drive line to an input shaft on an implement. The primary drive line includes a swivel hitch comprising an upper gearbox fastened to a tongue extending forwardly from the implement, and a lower gearbox mounted on a yoke assembly that is attached to the tractor. The upper gearbox has an input shaft and an output shaft with the upper gearbox output shaft being coupled to the implement input shaft. The lower gearbox has first and second shafts with the first shaft being coupled to the upper gearbox input shaft and the second shaft being connected to the tractor power-take-off shaft. The lower gearbox is mounted by means permitting limited repositioning of the lower gearbox with respect to the yoke assembly in order to compensate for any misalignment of the lower gearbox first shaft when coupling it to the upper gearbox input shaft.

DESCRIPTION OF THE DRAWINGS

FIG. 3 is a sectional view taken along lines 3—3 in FIG. 2; and

FIG. 4 is an enlarged sectional view taken along lines 4—4 in FIG. 3.

DESCRIPTION OF THE PREFERRED EMBODIMENT

Figure 1:
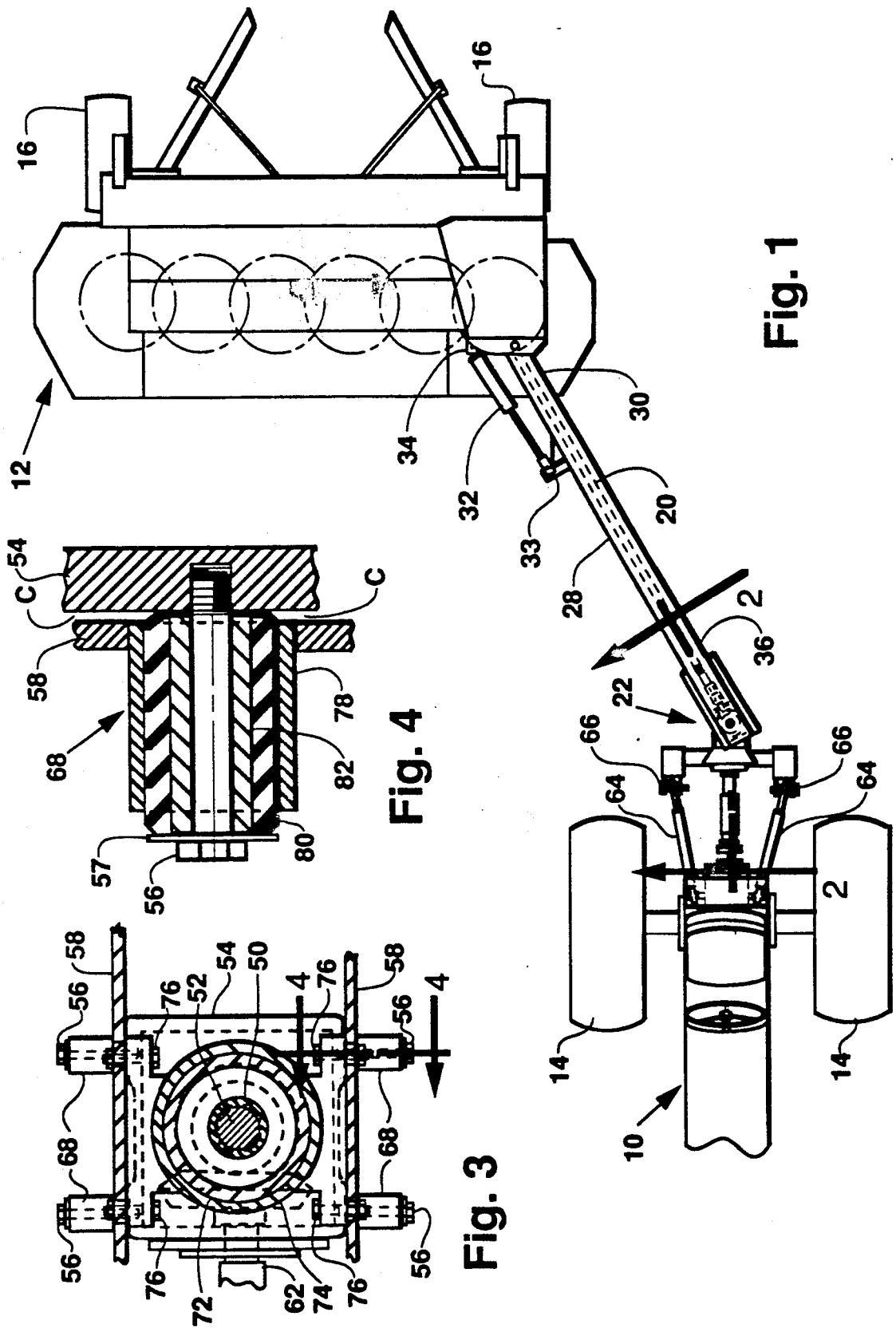
FIG. 1 is a top plan view of a tractor connected to an implement in accordance with the present invention.
Figure 2:
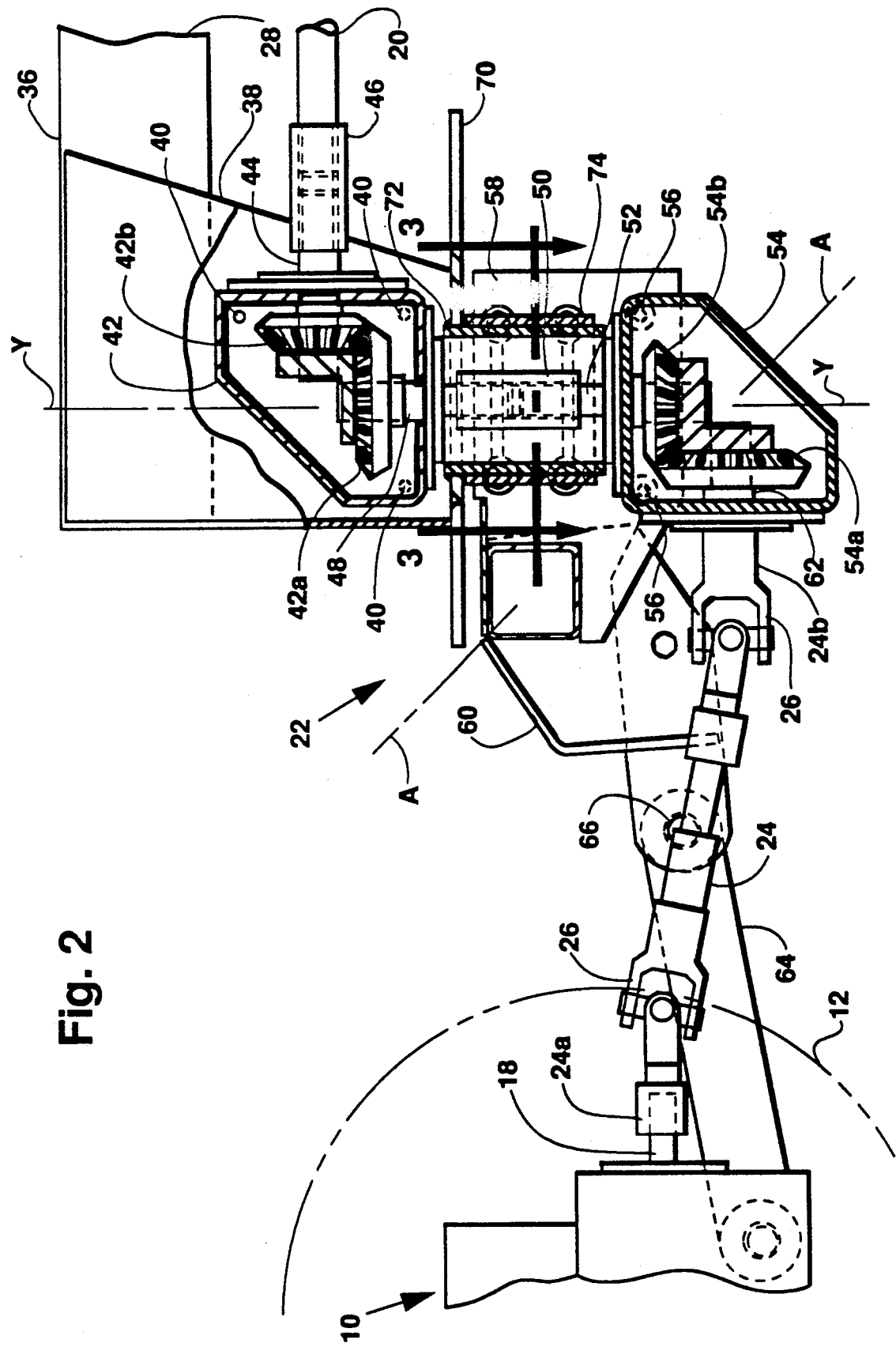
FIG. 2 is an enlarged sectional view taken along lines 2—2 in FIG. 1.

Referring to FIGS. 1 and 2, a tractor 10 is connected to an implement 12 such as a mower-conditioner. The tractor 10 has a pair of rear wheels 14, and the implement 12 has a pair of wheels 16. A power-take-off (pto) shaft 18 on the tractor 10 delivers power to an input shaft 20 on the implement 12 through a primary drive line which includes a swivel hitch 22 and a telescoping drive shaft 24 with conventional U-joints 26 at each end thereof. The pto shaft 18 is connected to an end coupler 24a on the drive shaft 24.

A tongue 28 has its trailing end 30 pivotally connected to the implement 12, and a hydraulic cylinder 32 is connected between a bracket 33 on the tongue 28 and another bracket 34 on the implement 12. The leading end 36 of the tongue 28 carries a pair of spaced apart, upper vertical plates 38 between which is fastened by six bolts 40 an upper gearbox 42 containing bevel gears 42a, 42b. Upper gearbox 42 has an output shaft 44 rigidly coupled to the implement input shaft 20 by a coupling sleeve 46. An input shaft 48 of the upper gearbox 42 is rigidly coupled by another coupling sleeve 50 to a first shaft 52 on a lower gearbox 54 containing bevel gears 54a, 54b. Lower gearbox 54 is fastened by four bolts 56 to a pair of spaced apart, lower vertical plates 58 that are carried by a yoke assembly 60. A second shaft 62 on the lower gearbox 54 is connected to an end coupler 24b on the drive shaft 24. The tractor 10 has a three point hitch with an upper link (not shown) and a pair of lower links 64 pivotally connected by pins 66 to the yoke assembly 60.

The bolts 56 extend through bushings 68 as seen in FIGS. 3 and 4. A horizontal plate 70 is fixed to the upper vertical plates 38, and a pivot tube 72 is welded to the plate 70. Surrounding the pivot tube 72 is a pivot housing 74 which is fastened by bolts 76 to the lower vertical plates 58. Referring to FIG. 4, the bushings 68 each include an outer sleeve 78 formed of a suitable metal such as steel that is welded to one of the lower vertical plates 58, and a rubber insert 80 disposed inside the outer sleeve 78. The rubber insert 80 is bonded to an inner sleeve 82 which is also formed of a suitable metal such as steel. The bolts 56 have washers 57 associated therewith and they extend through the bushings 68 into threaded engagement with the lower gearbox 54 so that a small clearance C is provided between each of the plates 58 and the lower gearbox 54. These clearances C and the rubber inserts 80 in the bushings 68 cooperate to permit limited repositioning of the lower gearbox 54 in order to compensate for any misalignment of the lower gearbox shaft 52 when it is being coupled to the upper gearbox input shaft 48 by the coupling sleeve 50.

The hydraulic cylinder 32 may be extended or retracted to swing the implement 12 between a normal operating position shown in FIG. 1 where the implement 12 is disposed outboard of the tractor 10 and a transport position (not shown) where the implement 12 is disposed generally behind the tractor 10. When the implement 12 is swung between its normal operating position and its transport position, the tongue 20 is pivoted at its leading and trailing ends 36, 30 thereby resulting in the upper gearbox 42 being pivoted about a generally vertical axis Y relative to the lower gearbox 54.

During normal harvesting operation of the tractor 10 and the implement 12, the tractor 10 makes right and left turns in order to maneuver the implement 12. When the tractor 10 turns, the lower gearbox 54 rotates with respect to the upper gearbox 42 about the vertical axis Y. The pivot housing 74 rotates on the pivot tube 72, but the gearboxes 42, 54 are not used as structural members. The draft load applied to the tractor 10 by the implement 12 does not pass through the gearboxes 42, 54 but is transmitted through tongue 28, upper vertical plates 38, horizontal plate 70, pivot tube 72, pivot housing 74, lower vertical plates 58, yoke assembly 60 and lower links 64.

The gear ratios of the gearboxes 42, 54 are identical and they are selected to accommodate either a tractor with a 540 rpm pto shaft or a tractor with a 1000 rpm pto shaft while maintaining the same speed for the implement input shaft 20. When changing tractor pto speeds (e.g. from 540 rpm to 1000 rpm), the lower gearbox 54 is unfastened from the lower vertical plates 58, rotated about a diagonal axis A, and then refastened to the lower vertical plates 58 so that its shaft 62 is coupled to the input shaft 48 of the upper gearbox 42 while its shaft 52 is connected to the drive shaft 24. The coupling sleeve 50 connecting the respective shafts 48, 62 of the gearboxes 42, 54 is changed to accommodate the differences in splines on the shafts 52, 62. The drive shaft 24 is also disconnected and rearranged end for end to accommodate the differences in splines between a 540 rpm tractor pto shaft and a 1000 rpm tractor pto shaft. In other words, the drive shaft end coupler 24b is connected to the pto shaft 18, and the drive shaft end coupler 24a is connected to the lower gearbox shaft 52.

It will be understood that on a 540 rpm tractor, the pto shaft 18 has six straight splines, whereas on a 1000 rpm tractor, the pto shaft 18 has twenty-one involute splines. The end coupler 24a on the drive shaft 24 has six straight grooves for mating with the six straight splines on the 540 rpm tractor pto shaft. The other end coupler 24b on the drive shaft 24 has twenty-one involute grooves for mating with the twenty-one involute splines on a 1000 rpm tractor pto shaft. The shaft 62 on the lower gearbox 54 has twenty-one involute splines that mate with the end coupler 24b on the drive shaft 24, and the shaft 52 on the lower gearbox 54 has six straight splines that mate with the end coupler 24a of the drive shaft 24. The input shaft 48 on the upper gearbox 42 has twenty-one involute splines while the output shaft 44 on the upper gearbox 42 has six straight splines. The implement input shaft 20 has twenty-one involute splines. The coupling sleeve 46 has six straight grooves on one end to mate with the six straight splines on the upper gearbox output shaft 44, and twenty-one involute grooves on the other end to mate with the twenty-one involute splines on the implement shaft 20. When a 540 rpm tractor is used, the coupling sleeve 50 has twenty-one involute grooves on one end to mate with the twenty-one involute splines on the upper gearbox input shaft 48, and six straight grooves on the other end to mate with the six straight splines on the input/output shaft 52 of the lower gearbox 54. When using a 1000 rpm tractor, the coupling sleeve 50 has twenty-one involute grooves on each end to mate with the twenty-one involute splines on both the upper gearbox input shaft 48 and the lower gearbox shaft 62.

What is claimed is:

1. In an arrangement wherein a power-take-off shaft on a tractor delivers power through a primary drive line to an input shaft on an implement, said primary drive line including a swivel hitch comprising:

an upper gearbox fastened to a tongue extending forwardly from the implement, the upper gearbox having an input shaft and an output shaft with said upper gearbox output shaft being coupled to said implement input shaft;

a lower gearbox mounted on a yoke assembly that is attached to the tractor, the lower gearbox having first and second shafts with said first shaft being coupled to said upper gearbox input shaft and said second shaft being connected to said tractor power-take-off shaft said yoke including a pair of spaced apart, lower vertical plates; and said lower gearbox being mounted by resilient means permitting limited repositioning of said lower gearbox with respect to said yoke assembly in order to compensate for any misalignment of said first shaft when coupling it to said upper gearbox input shaft, said resilient means including a plurality of bolts which extend through corresponding bushings having rubber inserts, each said bolt passing through a corresponding sleeve fixed to an adjacent one of said lower vertical plates and being threadably received in said lower gearbox, said rubber inserts being disposed between the corresponding said sleeve and bolt and being compressed between a washer and said lower gearbox.

2. The arrangement of claim 1, wherein said first shaft on said lower gearbox is rigidly coupled to said input shaft on said upper gearbox by a coupling sleeve.

3. The arrangement of claim 2, wherein said lower gearbox first shaft and said upper gearbox input shaft have splines which mate with grooves in opposite ends of said coupling sleeve.

4. The arrangement of claim 1, wherein said bushings are arranged so that clearances are provided between said lower vertical plates and said lower gearbox to assist in permitting said limited repositioning of said lower gearbox.

* * * * *